US007240140B2

(12) United States Patent
Bell

(10) Patent No.: US 7,240,140 B2
(45) Date of Patent: Jul. 3, 2007

(54) EFFICIENT DETECTION OF MULTIPLE ASSERTIONS IN A BUS

(75) Inventor: Shane L. Bell, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 707 days.

(21) Appl. No.: 10/796,957

(22) Filed: Mar. 11, 2004

(65) Prior Publication Data

US 2005/0212563 A1 Sep. 29, 2005

(51) Int. Cl.
*G06F 13/42* (2006.01)

(52) U.S. Cl. ........................ 710/306; 710/107

(58) Field of Classification Search .......... 710/306, 710/107, 305; 714/43, 48; 341/50, 51
See application file for complete search history.

(56) References Cited

U.S. PATENT DOCUMENTS

| 6,018,810 A | * | 1/2000 | Olarig ............... 714/43 |
| 6,489,900 B2 | * | 12/2002 | Shin et al. ........... 341/50 |
| 6,557,068 B2 | * | 4/2003 | Riley et al. .......... 710/306 |
| 6,721,918 B2 | * | 4/2004 | Self et al. ............ 714/800 |
| 7,003,605 B2 | * | 2/2006 | Craft et al. .......... 710/106 |

* cited by examiner

*Primary Examiner*—Vu A. Le
(74) *Attorney, Agent, or Firm*—Erik R. Nordstrom

(57) ABSTRACT

A mechanism detects multiple assertions in a bus efficiently by encoding each of N bus lines with $\log_2(N)$ pairs of bit lines.

19 Claims, 5 Drawing Sheets

EFFICIENT DETECTION OF MULTIPLE ASSERTIONS IN A BUS

BACKGROUND OF THE INVENTION

Some embodiments of the present invention are generally related to processor busses, and more particularly to detecting when more than one line in a bus is asserted.

In many microprocessor environments, busses may be used to connect various components as a mean of transferring signals and other data. One type of bus typically includes a collection of wires or lines that normally assert only one line or wire at a time. Busses are prone to various error conditions, which cause incorrect results. Error detection can be critical to processor stability and overall performance. Of the many types of errors that may occur, one of the more serious is when more than one line or wire asserts or goes hot at the same time. For example, when a soft error occurs, more than one line is asserted, causing errors in the processing of computer instructions.

Previous solutions to this problem include using extensive logic to examine every wire in a bus in relation to every other wire in the bus. This method is inefficient and expensive when the number of wires (N) is large, because the number of the (N−1)! states to monitor.

BRIEF DESCRIPTION OF THE DRAWINGS

The invention shall be described with reference to the accompanying figures, wherein.

Figure 1:
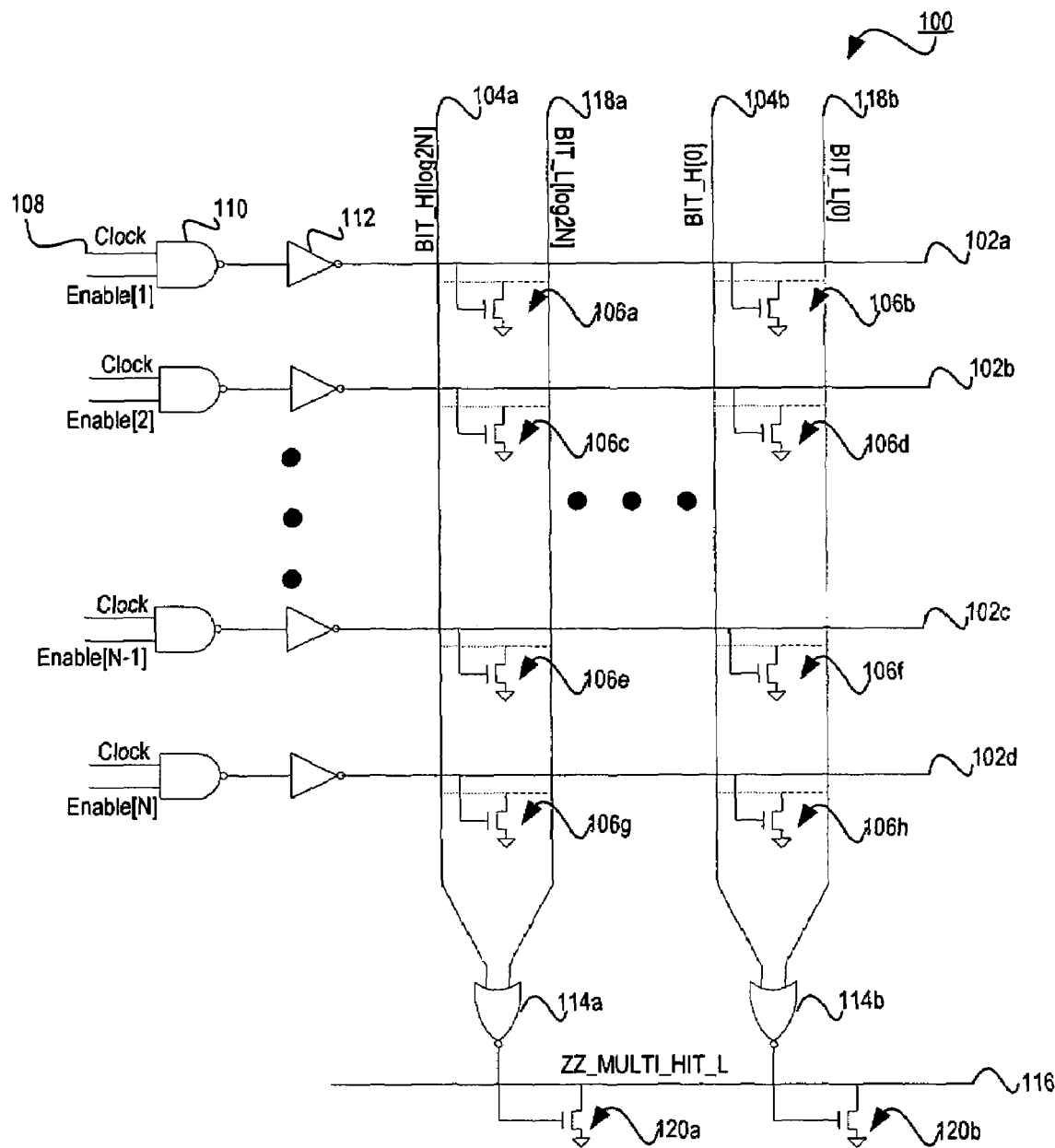
FIG. 1 illustrates a diagram of a multiple assertion detection apparatus, according to an embodiment of the present invention.

The invention is now described with reference to the accompanying drawings. In the drawings, like reference numbers generally indicate identical, functionally similar, and/or structurally similar elements. The drawing in which an element first appears is generally indicated by the leftmost digit(s) in the corresponding reference number.

DETAILED DESCRIPTION OF PREFERRED EMBODIMENTS

While the present invention is described in terms of the examples below, this is for convenience only and is not intended to limit its application. In fact, after reading the following description, it will be apparent to one of ordinary skill in the art how to implement the following invention in alternative embodiments (e.g., in systems employing in-order processing, out-of-order processing, etc.).

Furthermore, while the following description focuses on the recovery of instructions in a microprocessor using a form of an Itanium® Processor Family (IPF) compatible processor or in a Pentium® compatible processor family (both manufactured by Intel® Corporation, Santa Clara, Calif.), it is not intended to limit the application of the present invention. It will be apparent to one skilled in the relevant art how to implement the following invention, where appropriate, in alternative embodiments. For example, the present invention may be applied, alone or in combination, with various microprocessor architectures and their inherent features, such as, but not limited to, complex instruction set (CISC), reduced instruction set (RISC), very long instruction word (VLIW), and explicitly parallel instruction computing (EPIC).

In this detailed description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In this detailed description and claims, the term "coupled," along with its derivatives, such as, "connected" and "electrically connected", may be used. It should be understood that "coupled" may mean that two or more elements are in direct physical or electrical contact with each other or that the two or more elements are not in direct contact but still cooperate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The present invention may provide multiple assertion detection apparatus in a bus. In one embodiment of the present invention, the mechanism may determine when multiple wordlines assert when only one wordline should fire, which may be due to an error event, such as a soft error. This error-detection mechanism may be important to architectures that have either a large number of architected registers, such as in Intel Architecture-64 bit (IA-64), an instruction set architecture (ISA), or in large instruction windows for extracting ILP in an out-of-order execution core, in other ISAs, such as but not limited to IA-32, POWER PC®, and AMD 64®. POWER PC® is a registered trademark of International Business Machines Corp. or Armonk, N.Y. AMD 64® is a registered trademark of Advanced Micro Devices, Inc. of Sunnyvale, Calif. Additional trademark rights may apply. In addition, the error-detection mechanism may be important in use with large entry translation buffers (data & instruction). The present invention is not limited to these architectures, as one of ordinary skill in the art(s) would recognize, based at least on the teachings provided herein.

With respect to FIG. 1, a diagram of a circuit 100 for the efficient detection of multiple assertions in a bus, according to an embodiment of the present invention, is shown. As seen in FIG. 1, in an exemplary embodiment of the present invention, each line 102a, 102b, 102c, 102d (collectively 102) in a bus having N lines is encoded into a binary number representation of log2(N) bits. Both high and low assertions of the encoded binary number are created. The bus lines 102 can be coupled to a clock line 108 via a logical AND gate, comprised, for example, of an NAND gate 110 and a NOT gate 112. In an exemplary embodiment, the bus lines 102 are encoded by coupling a transistor 106a-106h (collectively 106) to one of a pair of bit lines, and there are log2(N) pairs of bit lines. Each pair of bit lines consists of one bit high line 104a, 104b and one bit low line 118a, 118b. The gate for each transistor 106 is tied to a bus line 102, and the drain for each transistor 106 is tied to either the bit high line 104 or the bit low line 118, depending on the encoding for that bus line. Each bit line pair 104 and 118 is input to a NOR gate 114a or 114b (collectively 114), which is coupled to another transistor 120a, 120b (collectively 120) and to a dynamic multi-hit line 116.

For any given bus line 102a-d, if more than one of the N lines 102 asserts, then both the high and low assertions for the encoding of that bus line will be pulled down. The asserted lines are input to a NOR gate 114 which is then input to a dynamic OR gate for all of the lines 116. If any of the bus line encodings has both the high and low bits pulled down, then the NOR gate 114 will rise and cause the dynamic multihit line 116 to pull down through the transistor 120, determining that multiple lines did assert.

Figure 2:
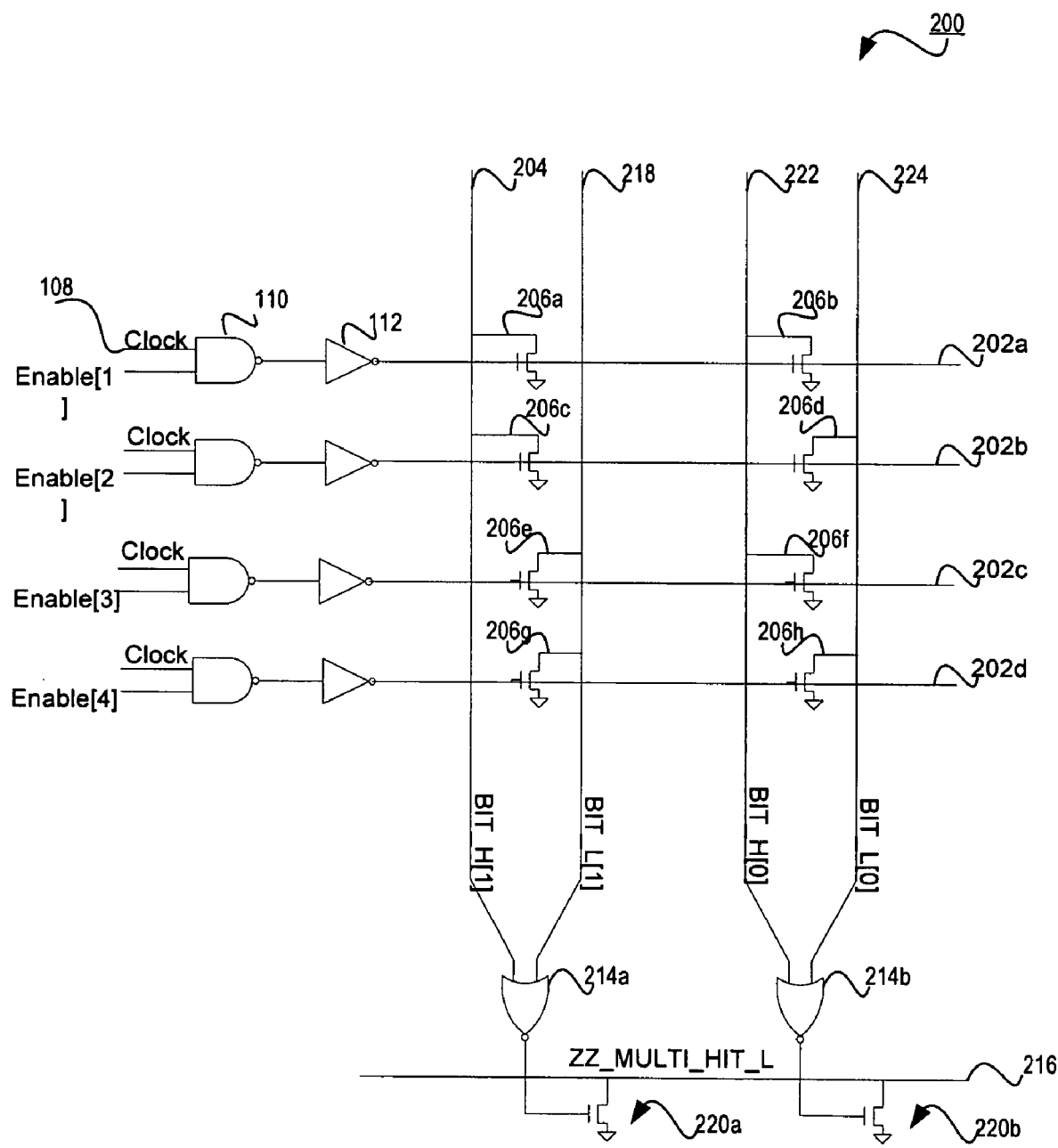
FIG. 2 illustrates a diagram of an multiple assertion detection apparatus, according to an alternative embodiment of the present invention.

Referring now to FIG. 2, a diagram of a circuit 200 having four bus lines is shown, according to an alternative embodiment of the present invention.

FIG. 2 shows an exemplary embodiment of the present invention having four bus lines. Four bus lines 202a, 202b, 202c, and 202d can be represented by two bits: 00, 01, 10, and 11. Accordingly, two pairs of bit lines 204 and 218, and 222 and 224, can be used to encode the four bus lines. In FIG. 2, bus line 202a is encoded to 00, bus line 202b to 01, bus line 202c to 10 and bus line 202d to 11. Accordingly, for bus line 202a (encoded to 00), the transistor 206a has its drain tied to bit high [1] 204, and the transistor 206b for bit line 222 has its drain tied to bit high [0] 222. Bus line 202b (encoded to 01) has a transistor 206c drain tied to bit high [1] 204 and a transistor 206d drain tied to bit low [0] 224. Bus line 202c (encoded to 10) has a transistor 206e drain tied to bit low [1] 218 and a transistor 206f drain tied to bit high [0] 222. Bus line 202d (encoded to 11) has a transistor 206g drain tied to bit low [1] 218 and a transistor 206h drain tied to bit low [0] 224. The bit line pair comprised of bit lines 204 and 218 is input to NOR gate 214a, and the bit line pair comprised of bit lines 222 and 224 is input to NOR gate 214b. The outputs of NOR gates 214a and 214b are tied, respectively, to the gates of transistors 220a and 220b. The drains of the transistors 220a and 220b are tied to multi-hit line 216.

When only one bus line asserts at a time, for example, bus line 202a, the bit high lines 204 and 222 are pulled down to logic zero. The bit low lines 218 and 224 remain precharged high. The bit lines values are NORed together. The NOR gate 214a receives 0 from bit line 204, and 1 from bit line 218 as input, and outputs 0 as a result. The NOR gate 214b receives 0 from bit line 222, and 1 from bit line 224 as input, and outputs 0 as a result. The multi-hit line 216 remains high and is not pulled down.

When two bus lines assert at the same time, for example, bus lines 202a and 202b, an error condition results which the exemplary embodiment of the present invention detects. Bus line 202a affects the bit lines as described above. When bus line 202b asserts, the bit lines 204 and 224 are pulled down to logic zero. When the bit lines 204 for bus lines 202a and 202b are NORed together, a 0 results. When the bit lines 218 for bus lines 202a and 202b are NORed together, a 1 results. These are input to NOR gate 214a, resulting in a 0. When the bit lines 222 for bus lines 202a and 202b are NORed together, a 0 results. When the bit lines 224 for bus lines 202a and 202b are NORed together, a 0 also results. These are input to NOR gate 214a, resulting in a 1. This causes the multi-hit line 216 to be pulled down to logic zero, indicating that multiple lines in the bus asserted.

According to the operating environments discussed below, the present invention, according to the embodiments described above, may be implemented in an apparatus designed to perform these operations.

Figure 3:
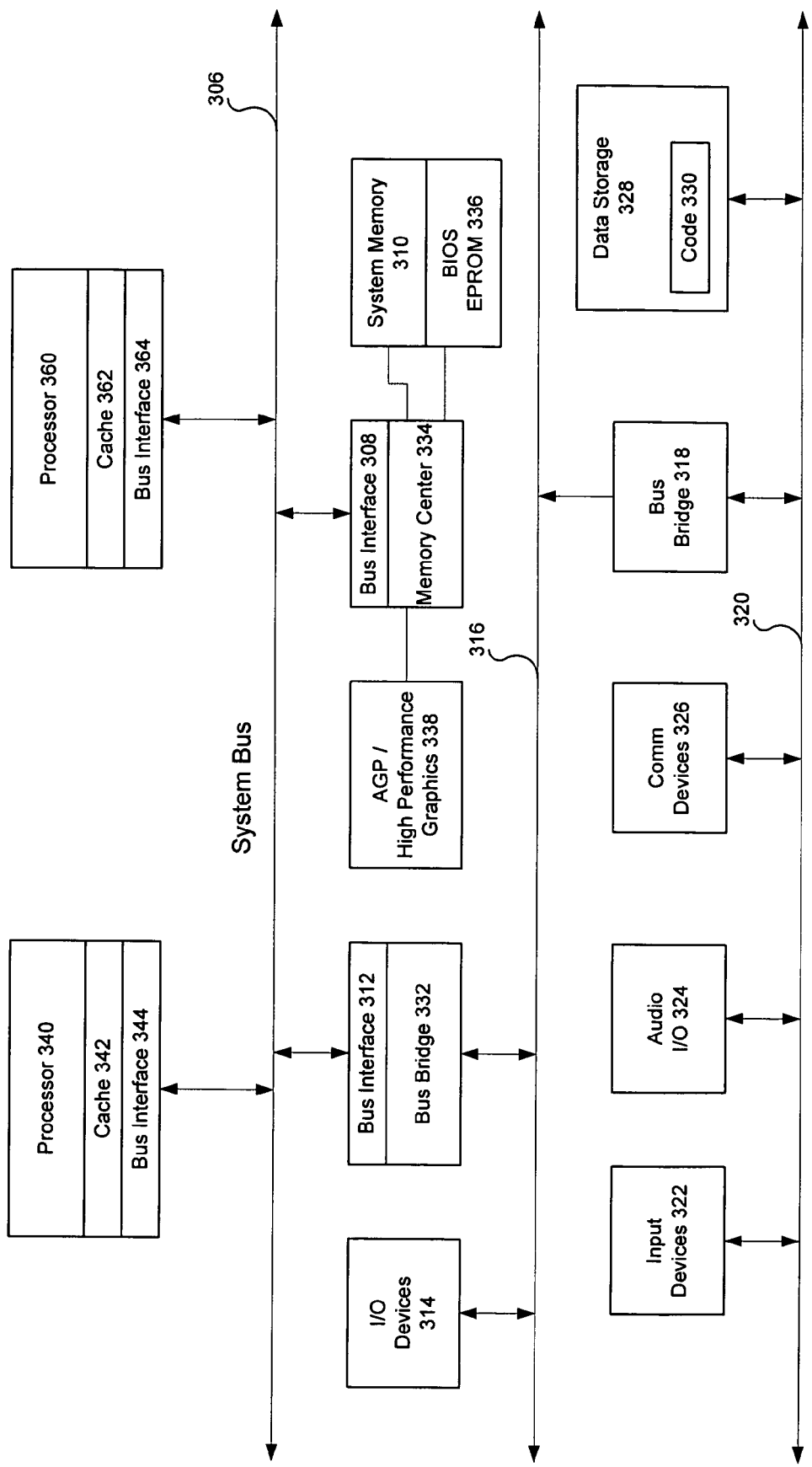
FIGS. 3-4 illustrate diagrams of system environments capable of being adapted to perform the operations of multiple assertion detection, according to embodiments of the present invention.
Figure 4:
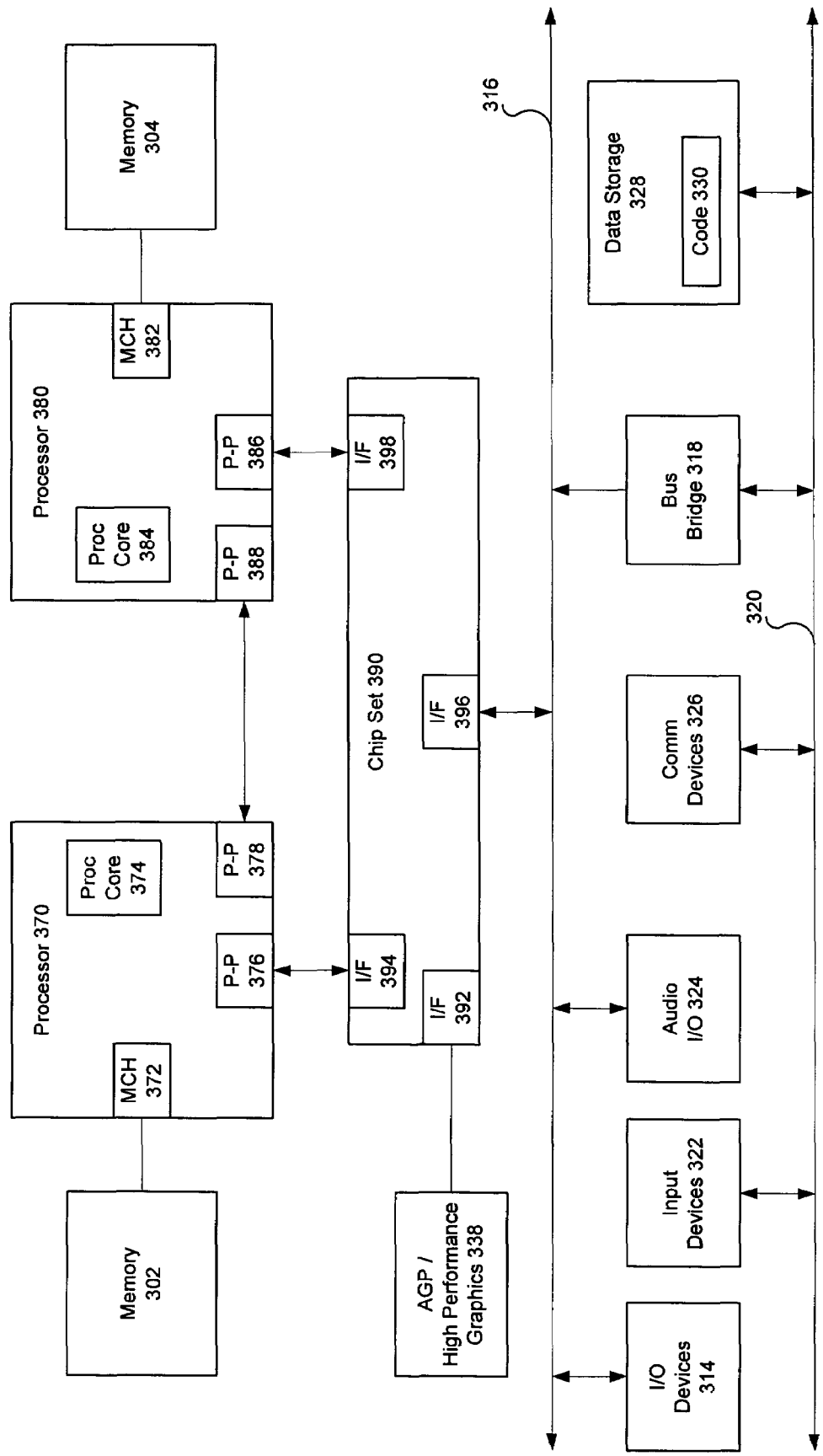

Specifically, and only by way of example, the present invention (i.e., the components of FIGS. 1-2 or any part thereof) may be implemented using one or more microprocessor architectures or a combination thereof and may be implemented with one or more memory hierarchies. In fact, in one embodiment, the invention may be directed toward one or more processor environments capable of carrying out the functionality described herein. An example of system environments 300 and 400 are shown in FIGS. 3 and 4 and include one or more central processing units, memory units, and buses. The system environments 300 and 400 may include a core logic system chip set that connects a microprocessor to a computing system. Various microprocessor architecture embodiments are described in terms of these exemplary micro-processing and system environments. After reading this description, it will become apparent to a person of ordinary skill in the art how to implement the invention using other micro-processing and/or system environments, based at least on the teachings provided herein.

Referring now to FIGS. 3 and 4, schematic diagrams of systems including a processor supporting execution of speculative threads are shown, according to two embodiments of the present invention. The system environment 300 generally shows a system where processors, memory, and input/output devices may be interconnected by a system bus, whereas the system environment 400 generally shows a system where processors, memory, and input/output devices may be interconnected by a number of point-to-point interfaces.

The system environment 300 may include several processors, of which only two, processors 340, 360 are shown for clarity. Processors 340, 360 may include level one (L1) caches 342, 362. The system environment 300 may have several functions connected via bus interfaces 344, 364, 312, 308 with a system bus 306. In one embodiment, system bus 506 may be the front side bus (FSB) utilized with Pentium® class microprocessor. In other embodiments, other busses may be used. In some embodiments memory controller 334 and bus bridge 332 may collectively be referred to as a chip set. In some embodiments, functions of a chipset may be divided among physical chips differently from the manner shown in the system environment 300.

Memory controller 334 may permit processors 340, 360 to read and write from system memory 310 and/or from a basic input/output system (BIOS) erasable programmable read-only memory (EPROM) 336. In some embodiments BIOS EPROM 336 may utilize flash memory. Memory controller 334 may include a bus interface 308 to permit memory read and write data to be carried to and from bus agents on system bus 306. Memory controller 334 may also connect with a high-performance graphics circuit 338 across a high-performance graphics interface 339. In certain embodiments the high-performance graphics interface 339 may be an advanced graphics port (AGP) interface. Memory controller 334 may direct read data from system memory 310 to the high-performance graphics circuit 338 across high-performance graphics interface 339.

The system environment 400 may also include several processors, of which only two, processors 370, 380 are shown for clarity. Processors 370, 380 may each include a local memory channel hub (MCH) 372, 382 to connect with memory 302, 304. Processors 370, 380 may exchange data via a point-to-point interface 350 using point-to-point interface circuits 378, 388. Processors 370, 380 may each exchange data with a chipset 390 via individual point-to-point interfaces 352, 354 using point to point interface circuits 376, 394, 386, 398. Chipset 390 may also exchange data with a high-performance graphics circuit 338 via a high-performance graphics interface 392.

In the system environment 300, bus bridge 332 may permit data exchanges between system bus 306 and bus 316, which may in some embodiments be a industry standard architecture (ISA) bus or a peripheral component interconnect (PCI) bus. In the system environment 400, chipset 390 may exchange data with a bus 316 via a bus interface 396. In either system, there may be various input/output I/O devices 314 on the bus 316, including in some embodiments low performance graphics controllers, video controllers, and networking controllers. Another bus bridge 318 may in some embodiments be used to permit data exchanges between bus 316 and bus 320. Bus 320 may in some embodiments be a small computer system interface (SCSI) bus, integrated drive electronics (IDE) bus, or universal serial bus (USB) bus. Additional I/O devices may be connected with bus 320. These may include input devices 322, which may include, but are not limited to, keyboards, pointing devices, and mice, audio I/O 324, communications devices 326, including modems and network interfaces, and data storage devices 328. Software code 330 may be stored on data storage device 328. In some embodiments, data storage device 328 may be, for example, but is not limited to, a fixed magnetic disk, a floppy disk drive, an optical disk drive, a magneto-optical disk drive, a magnetic tape, or non-volatile memory including flash memory.

Figure 5:
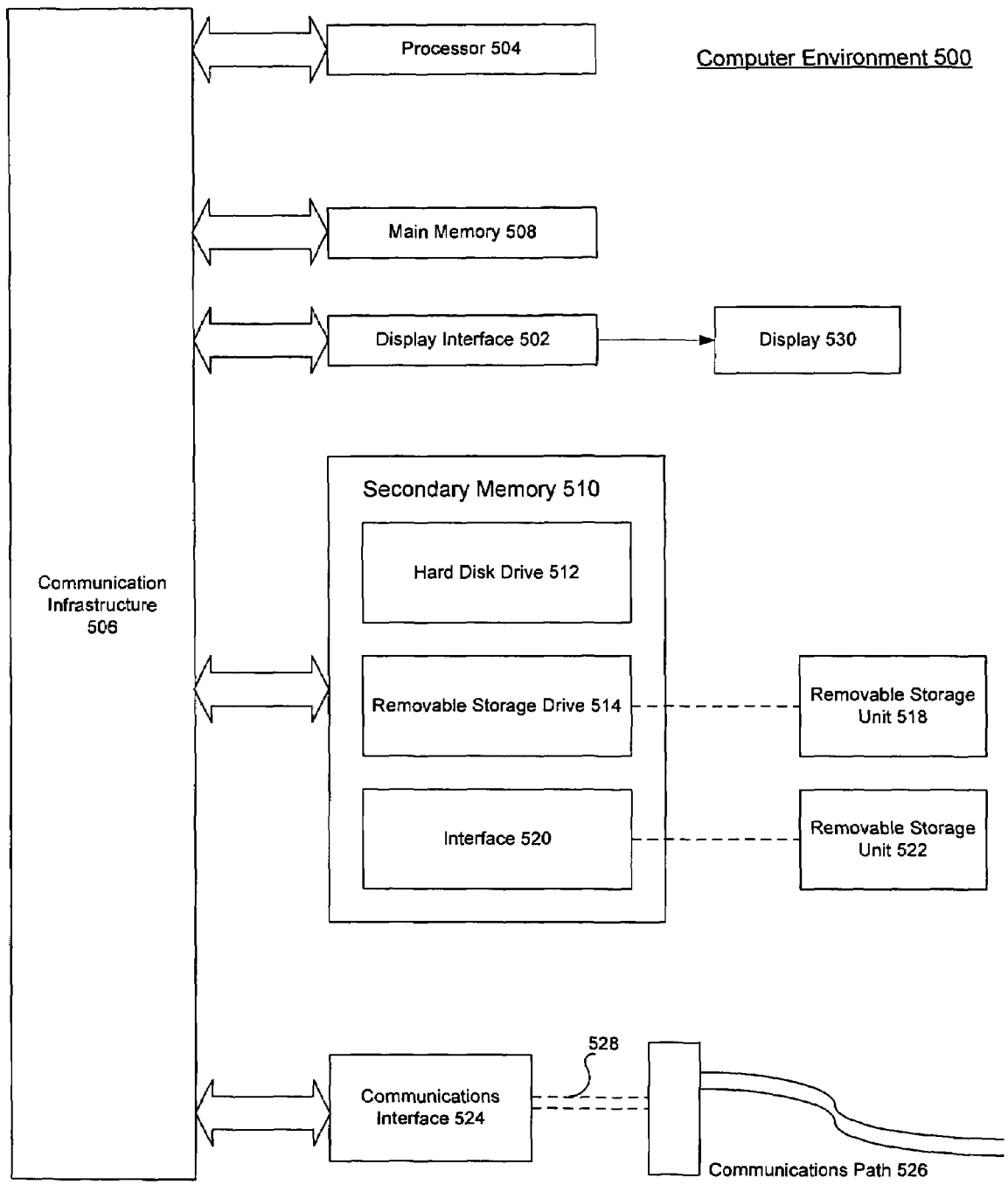
FIG. 5 illustrates a diagram of a computing environment capable of being adapted to perform the operations of multiple assertion detection, according to an embodiment of the present invention.

The present invention (i.e., the components of FIGS. 1-2 or any part thereof) may be implemented using hardware, software or a combination thereof and may be implemented in one or more computer systems or other processing systems. In fact, in one embodiment, the invention may comprise one or more computer systems capable of carrying out the functionality described herein. An example of a computer system 500 is shown in FIG. 5. The computer system 500 may include one or more processors, such as processor 504. The processor 504 may be connected to a communication infrastructure 506 (e.g., a communications bus, cross over bar, or network). Various software embodiments are described in terms of this exemplary computer system. After reading this description, it will become apparent to a person skilled in the relevant art(s) how to implement the invention using other computer systems and/or computer architectures.

Computer system 500 may include a display interface 502 that may forward graphics, text, and other data from the communication infrastructure 506 (or from a frame buffer not shown) for display on the display unit 530.

Computer system 500 may also include a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc, but which is not limited thereto. The removable storage drive 514 may read from and/or write to a removable storage unit 518 in a well known manner. Removable storage unit 518, may represent a floppy disk, magnetic tape, optical disk, etc. which may be read by and written to by removable storage drive 514. As will be appreciated, the removable storage unit 518 may include a computer usable storage medium having stored therein computer software and/or data.

In alternative embodiments, secondary memory 510 may include other similar means for allowing computer programs or other instructions to be loaded into computer system 500. Such means may include, for example, a removable storage unit 522 and an interface 520. Examples of such may include, but are not limited to, a program cartridge and cartridge interface (such as that found in video game devices), a removable memory chip (such as an EPROM, or PROM) and associated socket, and/or other removable storage units 522 and interfaces 520 that may allow software and data to be transferred from the removable storage unit 522 to computer system 500.

Computer system 500 may also include a communications interface 524. Communications interface 524 may allow software and data to be transferred between computer system 500 and external devices. Examples of communications interface 524 may include, but are not limited to, a modem, a network interface (such as an Ethernet card), a communications port, a PCMCIA slot and card, etc. Software and data transferred via communications interface 524 are in the form of signals 528 which may be, for example, electronic, electromagnetic, optical or other signals capable of being received by communications interface 524. These signals 528 may be provided to communications interface 524 via a communications path (i.e., channel) 526. This channel 526 may carry signals 528 and may be implemented using wire or cable, fiber optics, a phone line, a cellular phone link, an RF link and/or other communications channels.

In this document, the terms "computer program medium" and "computer usable medium" are used to generally refer to media such as, but not limited to, removable storage drive 514, a hard disk installed in hard disk drive 512, and signals 528. These computer program media are means for providing software to computer system 500.

Computer programs (also called computer control logic) may be stored in main memory 508 and/or secondary memory 510. Computer programs may also be received via communications interface 524. Such computer programs, when executed, enable the computer system 500 to perform the features of the present invention as discussed herein. In particular, the computer programs, when executed, may enable the processor 504 to perform the present invention in accordance with the above-described embodiments. Accordingly, such computer programs represent controllers of the computer system 500.

In an embodiment where the invention is implemented using software, the software may be stored in a computer program product and loaded into computer system 500 using, for example, removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). As discussed above, the invention is implemented using any combination of hardware, firmware and software.

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above described exemplary embodiments, but should be defined only in accordance with the following claims and their equivalents.

What is claimed is:

1. An apparatus, comprising:
   N bus lines, wherein N is a natural number;
   $\log_2(N)$ pairs of bit lines, wherein each of said $\log_2(N)$ pairs of bit lines includes a high bit line and a low bit line, and wherein each of said N bus lines is coupled to one of said high and low bit lines;
   $\log_2(N)$ NOR gates, each having at least a first input, a second input and an output, wherein each NOR gate is associated with one of said $\log_2(N)$ pairs of bit lines, and wherein for each NOR gate, said first input is coupled to said high bit line and said second input is coupled to said low bit line of one of said $\log_2(N)$ pairs; and
   a multi-hit line coupled to each output of said $\log_2(N)$ NOR gates.

2. The apparatus of claim 1, wherein N is a positive number.

3. The apparatus of claim 1, wherein N is a positive even number.

4. The apparatus of claim 1, wherein N is two.

5. The apparatus of claim 1, wherein each of said N bus lines is coupled to one bit line in one of said $\log_2(N)$ pairs of bit lines via a separate transistor according to an encoding of said bus line.

6. The apparatus of claim 5, wherein each transistor has a gate coupled to one bus line, a source coupled to ground, and a drain coupled to one of said high bit line and said low bit line, according to the encoding of said bus line.

7. The apparatus of claim 1, wherein each of said N bus lines is logically NAND coupled with a clock line.

8. The apparatus of claim 6, wherein each of said drains coupled to the same bit line is logically NOR coupled together and wherein an output of said logical NOR coupling is coupled to an input of one of said $\log_2(N)$ NOR gates.

9. A system, comprising:
   a processor including N bus lines, wherein N is a natural number,
   $\log_2(N)$ pairs of bit lines, wherein each of said $\log_2(N)$ pairs of bit lines includes a high bit line and a low bit line, wherein each of said N bus lines is coupled to one of said high and low bit lines, $\log_2(N)$ NOR gates, each having at least a first input, a second input and an output, wherein each NOR gate is associated with one of said $\log_2(N)$ pairs of bit lines, and wherein for each NOR gate, said first input is coupled to said high bit line and said second input is coupled to said low bit line of one of said $\log_2(N)$ pairs, and a multi-hit line coupled to each output of said $\log_2(N)$ NOR gates;
   at least one input-output device to couple with said processor via at least one of said N bus lines; and
   at least one data storage coupled to said processor.

10. The system of claim 9, wherein N is a positive number.

11. The system of claim 9, wherein N is a positive even number.

12. The system of claim 9, wherein N is two.

13. The system of claim 9, wherein each of said N bus lines is coupled to one bit line in one of said $\log_2(N)$ pairs of bit lines via a separate transistor according to an encoding of said bus line.

14. The system of claim 13, wherein each transistor has a gate coupled to one bus line, a source coupled to ground, and a drain coupled to one of said high bit line and said low bit line, according to the encoding of said bus line.

15. The system of claim 9, wherein each of said N bus lines is logically NAND coupled with a clock line.

16. The system of claim 13, wherein each of said drains coupled to the same bit line is logically NOR coupled together and wherein an output of said logical NOR coupling is coupled to an input of one of said $\log_2(N)$ NOR gates.

17. A system, comprising:
   at least one processor;
   N bus lines, where N is a natural number;
   $\log_2(N)$ pairs of bit lines, wherein each of said $\log_2(N)$ pairs of bit lines includes a high bit line and a low bit line, wherein each of said N bus lines is coupled to one of said high and low bit lines, $\log_2(N)$ NOR gates, each having at least a first input, a second input and an output, wherein each NOR gate is associated with one of said $\log_2(N)$ pairs of bit lines, and wherein for each NOR gate, said first input is coupled to said high bit line and said second input is coupled to said low bit line of one of said $\log_2(N)$ pairs, and a multi-hit line coupled to each output of said $\log_2(N)$ NOR gates;

at least one input-output device coupled to said at least one processor via at least one of said N bus lines; and at least one data storage coupled to said at least one processor.

18. The system according to claim 17, wherein said at least one processor comprises at least two processors, and wherein said at least two processors are coupled via at least one of said N bus lines.

19. The system according to claim 17, wherein at least one of said at least one data storage is coupled to said at least one processor via at least one of said N bus lines.

* * * * *